O. JENSEN.
PROCESS OF PRODUCING PURE CONCENTRATED NITRIC ACID AND TETROXID OF NITROGEN.
APPLICATION FILED FEB. 4, 1919.
1,324,255.
Patented Dec. 9, 1919.
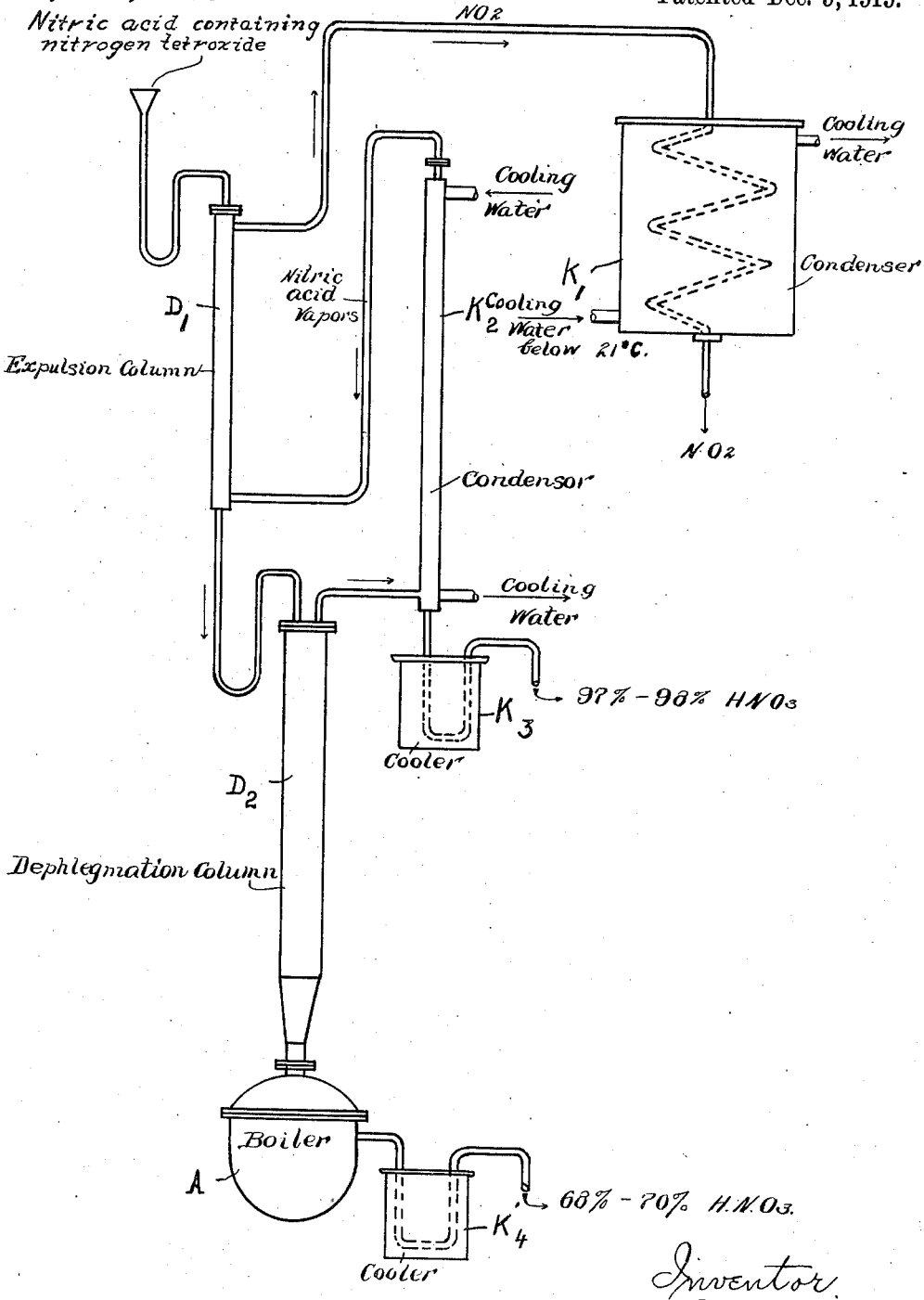

UNITED STATES PATENT OFFICE.

OLAF JENSEN, OF CHRISTIANIA, NORWAY, ASSIGNOR TO NORSK HYDRO-ELEKTRISK KVAELSTOFAKTIESELSKAB, OF CHRISTIANIA, NORWAY.

PROCESS OF PRODUCING PURE CONCENTRATED NITRIC ACID AND TETROXID OF NITROGEN.

1,324,255.     Specification of Letters Patent.     Patented Dec. 9, 1919.

Application filed February 4, 1919. Serial No. 274,945.

*To all whom it may concern:*

Be it known that I, OLAF JENSEN, a subject of the King of Norway, of Christiania, Norway, have invented certain new and useful Improvements in Processes of Producing Pure Concentrated Nitric Acid and Tetroxid of Nitrogen; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The invention relates to the manufacture of pure concentrated nitric acid from nitric acid containing nitrogen oxids and has for its object a process by means of which pure nitrogen tetroxid can be obtained in a more efficient manner than according to the known methods.

In the manufacture of concentrated nitric acid according to a known method (described in the German Patent No. 225706) nitric acid of a concentration of only 80–90 per cent. is obtained if the pressure and temperature are not raised to a very high degree, in which case it becomes possible to obtain an acid of up to 95–96 per cent. The acid of a lower concentration obtained by the use of moderate pressure and at ordinary temperatures also contains 20 to 30 per cent. nitrogen tetroxid. Attempts to produce from this impure acid a pure highly concentrated acid by distillation and dephlegmation will not meet with success. There will be obtained only a red fuming nitric acid, which it is very difficult to purify and decolorize by heating or by blowing a current of air through the same. The last named purification method is moreover not very economical in so far as it gives highly diluted nitrous gases, which again must be further treated to produce liquid nitrogen tetroxid by freezing or utilization by absorption in usual manner.

According to the present invention highly concentrated pure nitric acid as well as pure $NO_2$, which it is possible to use directly in the process, can be obtained. The nitrogen tetroxid is first expelled in a blower column by means of vapors of concentrated nitric acid, the acid purified in this manner being thereupon subjected to a dephlegmation treatment, whereby it is separated into an acid of high concentration (97–98 per cent.) and an acid of low concentration, (68–70 per cent.). The highly concentrated acid escapes in the form of vapor, while the less concentrated acid is withdrawn in a liquid condition. A portion of the acid vapors is condensed in the form of highly concentrated acid, while the rest is led to the blowing tower, in which the expulsion of nitrogen oxids takes place. A plant for carrying this process into effect in a continuous manner is illustrated diagrammatically in the accompanying drawing by way of example. In this example the acid containing nitrogen oxids is introduced at the top of the expulsion column $D_1$ in the bottom of which vapor of highly concentrated acid is introduced. From the bottom of this expulsion column the acid, which is now free from nitrogen oxids is led to the top of the dephlegmation column $D_2$ and from the bottom of this to the boiler A. The vapor of highly concentrated nitric acid which distils off from the top of the column $D_2$ is led to the condenser $K_2$, where it is partially condensed. The quantity of vapor, which is not condensed is led into the bottom of the column $D_1$. The temperature in this latter is controlled by means of the cooling effect in the condenser $K_2$. From the top of $D_1$ pure $NO_2$ escapes, which can be condensed in the condenser $K_1$ by cooling with water below 21° C. The pure highly concentrated acid leaves the apparatus through the cooler $K_3$ and the 70 per cent. acid through the cooler $K_4$.

I claim:

1. Process for the production of pure concentrated nitric acid and nitrogen tetroxid from nitric acid containing nitrogen oxids comprising the steps of passing the acid in counter current to nitric acid vapors, whereby nitrogen tetroxid is expelled and condensing the nitrogen tetroxid subjecting the acid purified by this treatment to, distillation and dephlegmation, so as to obtain on the one hand dilute liquid acid and on the other hand vapors of highly concentrated acid, a portion of the vapors of concentrated acid being passed in counter current with the acid to be purified and another portion being condensed to produce highly concentrated acid.

2. Process for the production of pure concentrated nitric acid and nitrogen tetroxid from nitric acid containing nitrogen tetroxid comprising removing nitrogen tetroxid from the acid to be purified by means of nitric acid vapors, separating the resulting acid into dilute liquid acid and vapors of highly concentrated acid, and condensing a portion of the latter and returning the remainder for treatment of the acid to be purified.

In testimony that I claim the foregoing as my invention, I have signed my name in presence of two subscribing witnesses.

OLAF JENSEN.

Witnesses:
C. VARMAN,
ROLF GAARDER.